United States Patent [19]

Ferguson et al.

[11] Patent Number: 5,061,965
[45] Date of Patent: Oct. 29, 1991

[54] FUSING ASSEMBLY WITH RELEASE AGENT DONOR MEMBER

[75] Inventors: Robert M. Ferguson, Penfield; Louis D. Fratangelo, Fairport; George J. Heeks, Rochester; Arnold W. Henry, Pittsford, all of N.Y.

[73] Assignee: Xerox Corporation, Stamford, Conn.

[21] Appl. No.: 516,950

[22] Filed: Apr. 30, 1990

[51] Int. Cl.⁵ .................. G03G 15/20; G03G 21/00
[52] U.S. Cl. .................. 355/284; 428/339; 430/99
[58] Field of Search ............ 355/284, 282, 285, 289, 355/290, 286; 118/60; 428/339, 447; 430/99; 432/60, 228

[56] References Cited

U.S. PATENT DOCUMENTS

| | | | |
|---|---|---|---|
| 4,011,362 | 3/1977 | Stewart | 428/447 |
| 4,029,827 | 6/1977 | Imperial et al. | 427/22 |
| 4,046,795 | 9/1977 | Martin | 260/448.2 |
| 4,101,686 | 7/1978 | Strella et al. | 427/22 |
| 4,149,797 | 4/1979 | Imperial | 355/290 |
| 4,185,140 | 1/1980 | Strella et al. | 428/418 |
| 4,257,699 | 3/1981 | Lentz | 355/284 |
| 4,264,181 | 4/1981 | Lentz et al. | 355/284 |
| 4,272,179 | 6/1981 | Sennar | 355/289 |
| 4,352,551 | 10/1982 | Iwao | 118/60 X |
| 4,434,355 | 2/1984 | Inagaki et al. | 432/60 X |
| 4,565,762 | 1/1986 | Kato | 432/60 X |
| 4,659,621 | 4/1987 | Finn et al. | 428/339 |
| 4,777,087 | 10/1988 | Heeks et al. | 428/32 |
| 4,923,755 | 5/1990 | Witucki | 428/447 |
| 4,950,546 | 8/1990 | Dubrow et al. | 428/447 |

Primary Examiner—A. T. Grimley
Assistant Examiner—Sandra L. Hoffman

[57] ABSTRACT

A release agent donor member for a toner fixing system wherein a polymeric release agent having functional groups is applied to the surface of a fuser member has a base member, an intermediate conformable silicone elastomer layer and an elastomer release agent donor layer comprising poly(vinylidenefluoride-hexafluoropropylenetetrafluoroethylene) where the vinylidenefluoride is present in an amount less than 40 mole percent, a metal oxide present in an amount sufficient to interact with the polymeric release agent having functional groups to transport a sufficient amount of the polymeric release agent to provide an interfacial barrier layer between the fusing surface and the toner and being substantially unreactive with said elastomer, the elastomer release agent donor layer having been cured from a solvent solution thereof with a nucleophilic curing agent and in the presence of less than 4 parts by weight of inorganic base per 100 parts of polymer, the inorganic base being effective to at least partially dehydrofluorinate the vinylidenefluoride.

18 Claims, 1 Drawing Sheet

FUSING ASSEMBLY WITH RELEASE AGENT DONOR MEMBER

CROSS REFERENCE TO RELATED APPLICATION

Reference is hereby made to copending application Ser. No. 07/166,577 filed Feb. 17, 1988 entitled FUSER MEMBER in the name of Clifford O. Eddy et al. and commonly assigned to the assignee of the present invention.

BACKGROUND OF THE INVENTION

The present invention relates generally to an electrostatographic printing apparatus and more particularly to a fusing system for fixing toner material to support substrate. In particular the present invention relates to a release agent donor member for a toner fixing station in such apparatus.

In the process of xerography, a light image of an original to be copied is typically recorded in the form of an electrostatic latent image upon a photosensitive member with subsequent rendering of the latent image visible by the application of electroscopic marking particles commonly referred to in the art as toner. The residual toner image can be either fixed directly upon the photosensitive member or transferred from the member to another support, such as a sheet of plain paper with subsequent affixing of the image thereto.

In order to fix or fuse the toner material onto a support member permanently by heat, it is necessary to elevate the temperature of the toner material to a point at which constituents of the toner material coalesce and become tacky. This action causes the toner to flow to some extent into the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the fuser roll thereby to affect heating of the toner images within the nip. Typical of such fusing devices are two roll systems wherein the fusing roll is coated with an adhesive material, such as a silicone rubber or other low surface energy elastomer or, for example, tetrafluoroethylene resin sold by E. I DuPont De Nemours under the trademark Teflon. The silicone rubbers which have been used as the surface of the fuser member can be classified into three groups according to the vulcanization method and temperature, i.e., room temperature vulcanization silicone rubber referred hereinafter referred to as RTV silicone rubber, liquid silicone rubber to as LSR rubber, and high temperature vulcanization type silicone rubber referred to as HTV rubber. All these silicone rubbers or elastomers are well known in the art and are commercially available.

In these fusing systems, however, since the toner image is tackified by heat it frequently happens that a part of the image carried on the supporting substrate will be retained by the heated fuser roller and not penetrate into the substrate surface. This tackified material will stick to the surface of the fusing roller and come in contact with the subsequent sheet of supporting substrate bearing a toner image to be fused. A tackified image which has been partially removed from the first sheet, may transfer to the second sheet in non-image portions of the second sheet. In addition, a portion of the tackified image of the second sheet may also adhere to the heated fuser roller. In this way and with the fusing of subsequent sheets of substrates bearing the toner images, the fuser roller may be thoroughly contaminated. In addition, since the fuser roller continues to rotate when there is no substrate bearing a toner image to be fused there between, toner may be transferred from the fuser roll to the pressure roll. These conditions are referred to in the copying art as "offset". Attempts have been made to control the heat transfer to the toner and thereby control the offset. However, even with the adhesive surfaces provided by the silicone elastomers, this has not been entirely successful.

It has also been proposed to provide toner release agents such as silicone oil, in particular, polydimethyl silicone oil, which is applied on the fuser roll to a thickness of the order of about 1 micron to act as a toner release material. These materials possess a relatively low surface energy and have been found to be materials that are suitable for use in the heated fuser roll environment. In practice, a thin layer of silicone oil is applied to the surface of the heated roll to form an interface between the roll surface and the toner image carried on the support material. Thus, a low surface energy, easily parted layer is presented to the toners that pass through the fuser nip and thereby prevents toner from offsetting to the fuser roll surface.

Some recent developments in fuser members, release agents and fusing systems are described in U.S. Pat. No. 4,264,181 to Lentz et al., U.S. Pat. No. 4,257,699 to Lentz and U.S. Pat. No. 4,272,179 to Seanor, all commonly assigned to the assignee of the present application. These patents describe fuser members and methods of fusing thermoplastic resin toner images to a substrate wherein a polymeric release agent having functional groups is applied to the surface of the fuser member. The fuser member comprises a base member having an elastomeric surface with a metal containing filler therein which has been cured with a nucleophilic addition curing agent. Exemplary of such fuser member is an aluminum base member with a poly(vinylidenefluoride-hexafluoropropylene) copolymer cured with bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

U.S. Pat. Nos. 4,029,827, to Imperial et al., 4,101,686 to Strella et al. 4,185,140 also to Strella et al also disclose the use of polymeric release agents having functional groups which interact with the fuser member to form a thermally stable renewable self cleaning layer having superior release properties for electroscopic thermo plastic resin toners, and are all commonly assigned to the assignee of the present invention.

In particular, U.S. Pat. No. 4,029,827 is directed to the use of polyorganosiloxane having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids.

PRIOR ART

According to Prior Art techniques the toner release agents may be applied to the fuser roll by several delivery mechanisms including wicking, impregnating webs and by way of a donor roll which may comprise an EPDM (terpolymer elastomer made from ethylene, propylene and diene monomer) core with a thin sleeve of Teflon, PFA (E.I. Dupont De Nemours) which is an independent extruded thin sleeve of material which is bonded onto the core.

The use of such a sleeve is very expensive and the manufacturing of such a donor roll, is tedious and inefficient, the yield being relatively low since so many of the sleeves are damaged during manufacture. Furthermore, in a fusing assembly such as that illustrated in FIG. 1, which will be described in greater detail hereinafter, such a sleeved donor roll is ineffective in that since the donor roll is driven by frictional engagement with the fuser roll, the hard Teflon PFA coating has a relatively low coefficient of friction difficulties are presented in providing the necessary driving component.

Another technique has been with the use of a donor roll made of a high temperature vulcanized silicone rubber material. A more recent development is described in U.S. Pat. No. 4,659,621 to Finn et al. wherein a release agent donor member is described as having a conformable donor surface comprising the crosslinked product of at least one addition curable vinyl terminated or vinyl pendant polyorganosilonane, a polyfunctional silicone hydride crosslinking agent crosslinking catalyst and finely divided filler. While these silicone elastomer donor rolls have been commercially successful in some commercial applications they suffer from certain difficulties in that they tend to swell by being in contact with a silicone oil release agent which migrates or is absorbed into the silicone rubber. While a small degree of swelling may be acceptable if it is uniform, failure of such rolls has been observed by excessive swelling over a period of operation wherein the donor roll may actually be twice the original size. Under such circumstances, the silicone rubber donor roll may no longer function in providing a uniform layer of release fluid to the fuser roll. Further, while donor rolls described in U.S. Pat. No. 4,659,621 have attractive oil delivery capabilities in that they are capable of transporting sufficient quantities of functional release agent to the fuser roll to form the interfacial barrier layer between the fuser roll and the toner they also tend to swell with the oil penetrating the rubber whereby there may be an interchange of the siloxane oil with the siloxane in the silicone rubber network leading to breakdown of the network and a lower crosslinked network thereby reducing the toughness of the silicone rubber barrier layer as more release agent penetrates the surface. This difficulty is particularly pronounced when operating at temperatures in excess of 300° F. and at very high printing speeds of the order of 135 copies per minute. Failure is observed by a mechanism referred to as chunking wherein pieces actually separate from the surface of the roll because the rubber has such low toughness. These small pieces can actually show up on a copier print. As a result of this chunking process the delivery of oil is no longer uniform to the fuser roll. An additional failure mode is referred to as debonding wherein the swelling of the silicone rubber has become so significant that it actually delaminates from the core of the donor roll.

SUMMARY OF THE INVENTION

In accordance with the present invention a long life, low swelling, composite release agent donor member and a fusing assembly of the type wherein a polymeric release agent having functional groups is applied to the surface of a fuser members is provided.

In a specific aspect of the present invention the release agent donor member comprises a base member, an intermediate conformable silicone elastomer layer and an elastomer release agent donor layer comprising poly (vinylidenefluoride-hexafluoropropylenetetrafluoroethylene) wherein the vinylidenefluoride is present in an amount less than 40 mole percent, a metal oxide present in an amount sufficient to interact with a polymeric release agent having functional groups to transport a sufficient amount of polymeric release agent to provide an interfacial barrier layer between the fusing surface and the toner and being substantially unreactive with the elastomer, the elastomer release agent donor layer having been cured from a solvent solution thereof with a nucleophilic curing agent soluble in said solution and in the presence of less than 4 parts by weight of inorganic base per 100 parts of polymer, said inorganic base being effective to at lease partially dehydrofluorinate the vinylidenefluoride.

In a further aspect of the present invention the nucleophilic curing agent is a bisphenol crosslinking agent including an organophosphonium salt accelerator.

In a further aspect of the present invention the metal oxide is a cupric oxide which is present in an amount of from about 5-30 parts by weight per 100 parts by weight of polymer and has a particle diameter from about 4 to about 8 microns.

In a further aspect of the present invention the intermediate silicone elastomer layer comprises the crosslinked product of a mixture of at least one polyorganosiloxane having the formula:

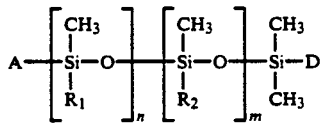

where $R_1$ and $R_2$ may be any of hydrogen or unsubstituted alkyl, alkenyl or aryl having less than 19 carbon atoms or fluorosubstituted alkyl having less than 19 carbon atoms, each of A & D may be any of hydrogen, methyl, hydroxl or vinyl groups and $0 < (m/n) \leq 1$ and $m + n > 350$; crosslinking agent and crosslinking catalyst.

In a further aspect of the present invention the intermediate layer is from about 5.5 millimeters to about 6.5 millimeters thick and the release agent donor layer is from about 0.025 to about 0.1 mm in thickness.

In a further aspect of the present invention the donor member as a hardness from about 35 to 45 Shore A.

DETAILED DESCRIPTION

The release agent donor member according to the present invention is a composite member wherein the release agent donor layer is made from the composition comprising in the fusing layer in the fusing roll as described in the above referenced copending application Ser. No. 07/166,577.

The composite donor member is typically in the configuration of an economical, highly reliable, long life cylindrical roll which is conformable with a fuser roll and provides uniform delivery of a sufficient amount of polymeric release agent having functional groups to provide an interfacial barrier layer between the fusing surface and the toner. By selecting the structure of the release agent donor member and materials of the composite according to the present invention the positive properties of the individual components are accentuated while the negative properties are minimized. Thus, as previously described while silicone elastomer rolls as release agent donor members on their own tend to swell resulting in earlier failure by providing a fluoroelastomer donor layer over the intermediate silicone elastomer layer, the release agent is not allowed to penetrate into the bulk of the donor member resulting in early failure from swelling. Furthermore, with the bulk of the release agent donor member being the silicone elastomer it provides the necessary conformability to the fuser roll to deliver a substantially uniform quantity of release agent across the surface of the fuser roll it being noted that a layer of the fluoroelastomer of the same thickness would not be as conformable with the fuser roll. Furthermore, the fluoroelastomer provides a surface toughness and wear resistance in addition to being somewhat permeable to gases such as oxygen which allows oxidative crosslinking to occur of the underlying silicone elastomer layer which counter balances the depolymerization of the silicone elastomer layer due to the high temperature.

Figure 1:
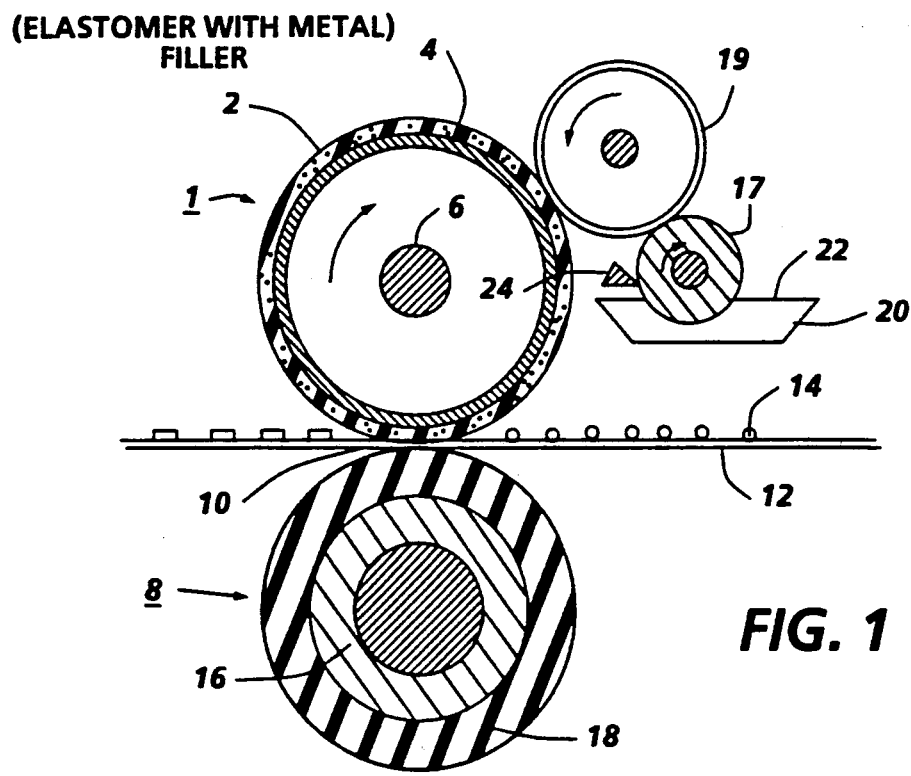
FIG. 1 is a sectional view of a fuser system which may use the release agent donor member of the present invention.

A typical release agent donor member of the present invention is described in conjunction with a fuser assembly as shown in FIG. 1 where the numeral 1 designates a fuser roll comprising an elastomer fusing surface 2 having metal oxide filler dispersed therein (not shown) upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which has chemically reactive functional groups thereon which are capable of interacting with the metal oxide filler dispersed in the elastomer fusing surface 2. The polymeric release agent 22 having functional groups thereon, may be a solid or liquid at room temperature, but it is a fluid at operating temperatures. In a preferred embodiment, the chemically reactive groups of polymeric release material 22 in sump 20 are mercapto, carboxy, hydroxy, isocyanate, epoxy, and amino. The most preferred polymeric release agents having functional groups thereon used in accordance with the present invention are the mercapto-funtional polyorganosiloxanes.

In the embodiment shown in FIG. 1 for applying the polymeric release agent 22 to elastomer fusing surface 2, a metering roll 17 made for example of chrome plated steel and release agent delivery roll 19 rotatably mounted in the direction indicated are provided to transport release agent 22 from the sump 20 to the fuser surface. As illustrated in FIG. 1, roll 17 is partly immersed in the sump 20 and transports on its surface release agent from the sump to the release agent donor or delivery roll 19. By using a metering blade 24 a layer of polymeric release fluid can be applied initially to donor roll 19 and subsequently to fusing surface 2 in controlled thickness ranging from submicron thickness to thickness of several microns of release fluid. Thus, by metering device 24, about 0.1 to 2 microns or greater thicknesses of release fluid can be applied to the surface of elastomer 2.

Figure 2:
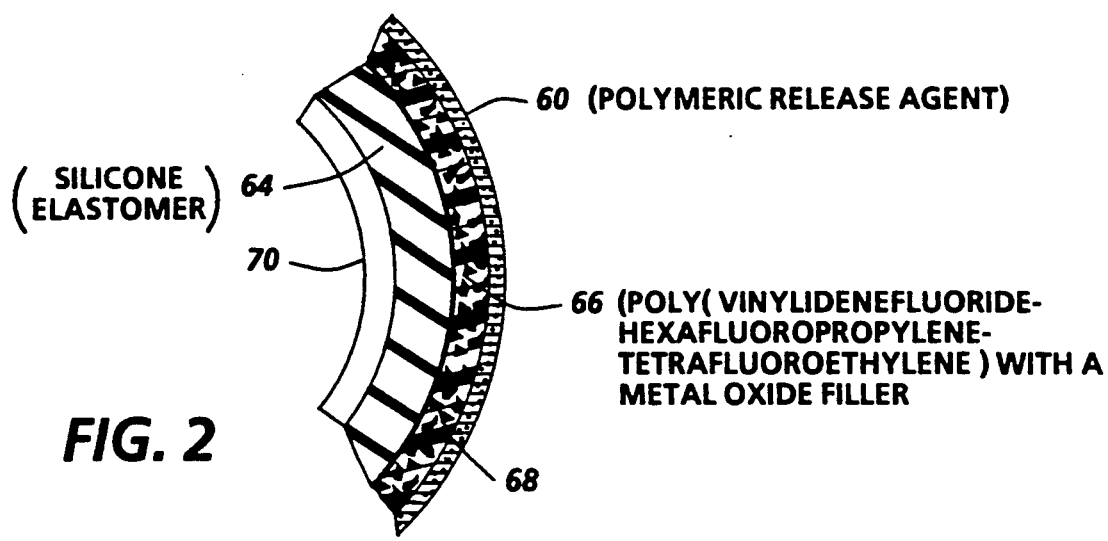
FIG. 2 is a fragmentary sectional view of one embodiment of the release agent donor member of the present invention.

Referring to FIG. 2, there is shown a fragmentary view of part of the donor member of the present invention magnified many times in order to show the layers of the donor member surface. In FIG. 2, the base member or other solid structure upon which the intermediate silicone elastomer is applied is designated by numeral 70. Intermediate silicone elastomer 64 which may contain a suitable filler is deposited upon primed base member 70 by any suitable means such as by injection, compression or transfer molding or being extruded. The release agent donor layer of poly(vinylidene fluoride hexafluoropropylene-tetrafluoroethylene) where the vinylidenefluoride is present in an amount less than 40 mole per cent and a metal oxide filler 66 is illustrated as numeral 68. The metal oxide filler particles 66 shown in FIG. 2 are illustrated as having irregular shapes. However, any form of metal oxide may be used in elastomer 64 including powders, flakes, platelets, spheroids, fibers, ovoid particles and the like. A film of polymeric release agent having functional groups is shown on the surface of elastomer 64 and is designated by numeral 60.

In operation the four rolls may be independently driven or according to a preferred embodiment of the present invention, the drive input is directed to the fuser roll with the release agent donor roll 19 being driven by frictional contact with the surface of the fuser roll and the oil metering roll 17 being driven by frictional contact with the release agent donor roll 19 in the direction indicated by the arrows in FIG. 1. The pressure roll 18 may also be driven by frictional control with the fuser roll thereby forming the fusing nip therebetween it and fuser roll 1. A release agent delivering roll 17 delivers release agent from the sump 20 to the surface of the release agent donor roll 19 and by film splitting at the nip of the delivery roll and donor roll delivers an amount of the release agent to the surface of donor roll 19. As the donor roll rotates in contact with the fuser roll the thin film of release agent on the donor roll 19 is split with a portion about 50 percent being transferred to the fuser roll 19, and a portion being retained on the donor roll 19.

The release agent donor roll according to the present invention may comprise a shaft with a solid or hollow cylinder about 8 millimeters to 22 millimeters in diameter and a conformable donor surface coating from 3 about to 7 millimeters in thickness. The surface coating may be even thicker if desired to adjust for certain nip characteristics. Typically the rolls are from about 12 to 18 inches in length.

The fluoroelastomers which may be used in accordance with the release agent donor member of the present invention must be elastomer which can withstand elevated temperatures generally from about 90° C. to about 200° C. or higher depending upon the temperature desired for fusing or fixing the thermoplastic resin powder to the substrate. The fluoroelastomers used in the present invention must resist degradation or attack by the particular polymeric release agent having functional groups which is used to promote release of molten plastic resin powder or toner from the fuser member. The preferred fluoroelastomers are poly(-vinylidenefluoride-hexafluoropropylene-tetrafluoroethylene) wherein the vinylidenefluoride is present in an amount less than 40 mole percent. By restricting the vinylidenefluoride content, the terpolymers and tetrapolymers have a relatively high fluorine content thereby providing fewer sites available to dehydrofluorination, the formation of double bonds leading to subsequent surface hardening and an increase in the surface energy of the fusing layer. Typically, the commercially available materials are peroxide curable and therefore have a cure site monomer susceptible to free radical attack introduced to enhance the curability with aliphatic peroxide systems. Typical monomers include bromo trifluoroethylene, 1 bromo 2-2-difluoroethylene, 3-bromo tetrafluoro 1 propene, 4-bromo 1-1-3 trifluorobutene and 4 bromo 3-3-4-4 tetrafluoro 1 butene. Commercially available fluoroelastomers having relatively low quantities of vinylidenefluoride include Viton GF available from E. I. DuPont DeNumours, Inc. The Viton GF has 35 mole percent of vinylidene fluoride, 34 percent hexafluoropropylene and 29 mole percent tetrafluoroethylene with, 2 percent cure site monomer. Viton GF is generally cured with a conventional ailphatic peroxide curing agent. However, according to the present invention, it is cured by the nucleophilic curing system in the presence of relatively low amounts of inorganic base materials as will be discussed hereinafter.

It is critical that the metal oxide dispersed in the fluoroelastomer upon the donor member surface be capable of interacting with the functional groups of the polymeric release agent to transport a sufficient amount of the release agent to form a thermally stable film which releases thermoplastic resin toner and prevents the thermoplastic resin toner from contacting the fluoroelastomer material itself. It is also important that the metal oxide be substantially unreactive with the fluoroelastomer. By being substantially unreactive with the fluoroelastomer, it is intended to define the absence of significant interaction between the metal oxide and the elastomer wherein any substantial dehydroflourination of the vinylidenefluoride in the polymer may take place. In addition the metal oxide softens rather than hardens the composition with time thus avoiding the undesirable hardening and consequent deterioration of copy quality, i.e. the development of glossy solid areas. We have found cupric oxide, a weak base to be very effective in accordance with the practice of the present invention. The cupric oxide softens rather than hardens the fluorelastomer with time. Any suitable amount of metal oxide may be employed providing that a sufficient amount is present to transport a sufficient amount of polymeric release agent to the fuser surface to form the thermally stable interfacial film between the fluoroelastomer surface and thermoplastic resin toner. Typically, the metal oxide is present in an amount of from about 5 to 30 parts by weight per 100 parts of the polymer although it is preferred to have from about 10 to 20 parts by weight of the metal oxide. The particle size of the metal oxide is important in that it should not be so small as to interfere with the curing of the polymer nor so large as to supply an insufficient number of particles dispersed throughout the elastomeric surface for good release properties. Typically, the particle size is from about 4 to 8 microns preferably 6 microns.

Other adjuvents and fillers may be incorporated in the elastomer in accordance with the a present invention as long as they do not effect the integrity of the elastomer, the interaction between the metal oxide and the polymeric release agent having functional groups or prevent the appropriate crosslinking of the elastomer. Such fillers normally encountered in the compounding of elastomers include coloring agents, reinforcing fillers, crosslinking agents, processing aids, accelerators and polymerization initiators.

The nucleophilic curing system with the bisphenol crosslinking agent and organophosphonium salt accelerator is described in U.S. Pat. No. 4,272,179. However, according to the present invention the nucleophilic curing agent (crosslinking agent and accelerator) is soluble in a solvent solution of the polymer and is used in the presence of less than 4 parts by weight of inorganic base per 100 parts by weight of polymer. Normally, the terpolymers and tetrapolymers of vinylidenefluoride hexafluoropropylene and tetrafluoroethylene are peroxide cured. However, the preferred fabricating procedure for a release agent donor is to spray a solvent solution of the polymer onto a substrate thereby rendering peroxide curing in air difficult since the peroxide preferentially reacts with oxygen in the air rather than curing the polymer. The preferred alternative curing system is a nucleophilic curing system such as a bisphenol crosslinking agent and an organophosphonium salt accelerator. Typically, the curing process takes place in the presence of 8 to 10 parts by weight of inorganic base per 100 parts of polymer. The inorganic base dehydrofluorinates the vinylidenefluoride in the polymer creating double bonds which act as reactive sites for crosslinking. However, the presence of excess base results in the long term degradation of the elastomers and if excess base continues to dehydrofluorinate the vinylidenefluoride generating double bonds which cause the donor member to harden, upon subsequent oxidation causes the surface energy to increase and the performance to degrade. Thus, it is preferred to cure the polymer at a relatively low base level to control the reactivity of the vinylidene fluoride. The typical curing agents such as Viton curative No. 30 which is about 50 percent by weight bisphenol AF and 50 percent by weight poly(vinylidenefluoride-hexafluoropropylene) and Viton curative No. 20 which is about one third triphenyl benzyl phosphonium chloride and two thirds poly(vinylidenefluoride-hexafluoropropylene) both available from E. I. DuPont de Nemours Company will not function as curing agents at low base levels. While the exact reason for this is not clear, it is believed to be at least in part due to the fact that curative No. 20 is not soluble in the solvent solution of the polymer and therefore is not in close proximity to many of the smaller number of reactive sites for crosslinking performed by the dehydrofluorination of the vinylidenefluoride. While curatives No. 20 and 30 do not function effectively at low base levels, we have surprisingly found that another Viton curative, curative No. 50 also available from E. I. DuPont de Nemours which is normally used with high base levels can be used to cure poly(vinylidenefluoride-hexafluoropropylene-tetrafluoroethylene) at less than one half its normal base level or less than about 4 parts by weight per 100 parts of polymer. Since the curative No. 50 is soluble in the solvent solution of the polymer at low base levels it is readily available at the reactive sites for crosslinking. The Viton curative No. 50 incorporates an accelerator (a quaternary phosphonium salt or salts) and a crosslinking agent, bisphenol AF into a single curative system.

As described in the cross referenced application the donor member has a vinylidenefluoride content having a good balance between being as completely fluorinated as possible and still be capable of being adequately crosslinked, having a filler which is interactive with the functional release agent providing anchoring sites therefore but which is unreactive with the elastomer. In addition the fluoroelastomer which is more resistant to attack by basic materials, and can be sprayed from a nucleophilic curing system wherein the curing agent is soluble in a solvent solution of the elastomer thereby providing proximity of the curing agent to the activated crosslinking sites. Furthermore, the amount of inorganic base is controlled to generate active sites for crosslinking but not be present in amounts for sufficient substantial increase in surface energy.

This balance is provided by a donor surface comprising poly(vinylidenefluoride-hexafluoropropylene-tetrafluoroethylene) wherein the vinylidenefluoride is present in an amount less than 40 mole percent, a metal oxide present in an amount sufficient to interact with the polymeric release agent having functional groups to transport a sufficient amount of polymeric release agent to provide an interfacial barrier layer between the fusing surface and the substrate and which is substantially unreactive with the fluoroelastomer, the fluoroelastomer having been cured from a solvent solution thereof with a nucleophilic addition curing agent soluble in the solvent solution and in the presence of less than 4 parts by weight of inorganic base per 100 parts of polymer, the inorganic base being effective to at least partially dehydrofluorinate the vinylidenefluoride.

The intermediate silicone elastomer layer is a polyorganosiloxane curable to a silicone elastomer and may be selected from the commercially available condensation curable, addition curable and peroxide curable materials. Typically the silicone elastomer layer comprises the crosslinked product of a mixture of at least one polyorganosiloxane having the formula.

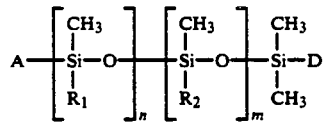

where $R_1$ and $R_2$ may be any of hydrogen or unsubstituted alkyl, alkenyl or aryl having less than 19 carbon atoms, or fluorosubstituted alkyl having less than 19 carbon atoms, each of A & D may be any of hydrogen methyl, hydroxl or vinyl groups and $O<(m/n)\leq 1$ and $m+n>350$; crosslinking agent and crosslinking catalyst. Typically, $R_1$ and $R_2$ are hydrogen, methyl, vinyl, phenyl or trifluoropryl.

Attention is directed to U.S. Pat. No. 4,777,087 to Heeks et al. for a more complete discussion of silicone elastomers suitable in the practice of the present invention. Typically commercially available materials include Dow Corning LSR 590, Bayer 3174/35, General Electric 3045, and others having similar physical properties.

The substrate for the release agent donor member according to the present invention may be of any suitable material. Typically, it takes the form of a cylindrical tube of aluminum steel or certain plastic materials chosen to maintain rigidity, instructural integrity, as well as being capable of having the silicone elastomer coated thereon and adhered firmly thereto. Typically the release agent donor rolls may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. The silicone elastomer may be applied according to conventional techniques such as injection molding and casting after which it is cured for up to 15 minutes and at 120 to 180 degrees centigrade to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as Isopropyl alcohol to remove all debris.

The surface of the release agent donor member is preferably prepared by applying either in one application or in successive applications to the surface of the primed or unprimed silicone elastomer, a thin coating or coatings of the fluoroelastomer-containing metal oxide filler dispersed therein. Coating is most conveniently carried out by spraying, dipping, or the like a solution or homogeneous suspension of the fluoroelastomer containing the filler. While molding, extruding and wrapping techniques are alternative means which may be used, we prefer to spray successive applications of a solvent solution of the fluoroelastomer and metal oxide filler to the surface to be coated. Typical solvents that may be used for this purpose include methyl ethyl ketone, methyl isobutyl ketone and the like. When successive applications are made to the surface to be coated it is generally necessary to heat the film coated surface to a temperature sufficient to flash off any solvent contained in the film. For example, when the elastomer having metal oxide dispersed therein is successively applied to the roll in thin coatings between each application evaporation of the solvent in the film coated on the roll is carried out at temperatures of at least 25° C. to about 90° C. or higher so as to flash off most of the solvent contained in the film. When the desired thickness of coating is obtained, the coating is cured and thereby bonded to the roll surface. A typical step curing process is heating for 2 hours at 93° C., followed by 2 hours at 149° C., followed by 2 hours at 177° C., followed by 2 hours at 208° C. and 16 hours at 232° C.

As illustrated the release agent donor member according to the present invention is preferably a cylindrical roll having a rigid core with an intermediate conformable silicone elastomer layer from about 5.5 to about 6.5 millimeters in thickness and an outer release agent donor layer from about 0.025 millimeters to 0.1 millimeter in thickness. The intermediate silicone elastomer layer is filled and crosslinked to provide a hardness from about 35 to 45 Shore A to enable sufficient conformability to the fuser roll to provided a uniform delivery of release agent to the fuser roll. This is further enabled by the relatively thinner fluoroelastomer donor layer which transports the release agent to the fuser roll. Further the fluoroelastomer layer provides a surface toughness and wear resistance to the donor member as well as providing a barrier to the penetration of release agent into the bulk of the intermediate silicone elastomer layer. In addition, it is permeable to oxygen which permits oxidative crosslinking to occur of the underlying intermediate silicone elastomer layer which counterbalances the depolymerization of the silicone due to high temperature. Accordingly, the thickness of the fluoroelastomer release agent donor layer is controlled within the above range so that it is permeable to oxygen. The metal oxide present in the release agent donor layer functions in a manner similar to the metal oxide present in the fusing surface of the above referenced patents to Strella et al in that it interacts with the functional groups of the functional release agent to form a layer on the donor roll of sufficient quantity that it is capable of transporting a sufficient amount of release agent to the fuser roll of to provide an interfacial barrier layer between the fusing surface and the toner. In the absence of a metal oxide insufficient quantities of functional release agent would be transported by the donor roll to the fuser roll. The release agent donor roll according to the present invention may be used in a fusing assembly with any suitable metal containing fuser roll including bare metal, metal oxide, metal salt, and metal oxide, or metal salt metal filled elastomeric rolls wherein the metal interacts with the functional groups of the polymeric release agent to form an interfacial barrier layer between the fusing surface and the toner. In a preferred embodiment the fuser roll described in the above referenced copending application Ser. No. 07/166,577, with a metal oxide filler is used.

Any suitable polymeric release material having functional groups may be employed in the practice of the present invention. Typical polymeric release agents are described in U.S. Pat. No. 4,101,686 which describes polyorganosiloxane fluids as release agents. The polyorganosiloxane fluids and other polymer fluids having functional groups interact with the metal oxide particles in the donor member to form a layer of release agent which is transported by the donor member to the fuser member. The metal oxide particles in the fuser member interact with the fluids having functional groups in such a manner as to form an interfacial barrier at the surface of the fuser member while leaving an unreacted low surface energy release fluid as an outer layer film. Other exemplary polymeric release agents having functional groups are described in U.S. Pat. Nos. 4,046,795, 4,029,827 and 4,011,362. The polymeric release agent having functional groups thereon may be found as a liquid or solid at room temperature but it is a fluid at operating temperatures. In preferred embodiments, the chemically reactive groups of polymeric release material are mercapto, carboxy, hydroxy, isocyanate, epoxy, and amino. The most preferred polymeric release agents having functional groups theron used in accordance with the present invention are the mercapto functional polyorganosiloxanes described in U.S. Pat. Nos. 4,101,686 and 4,029,827.

The following Examples further define and describe donor rolls prepared by the present invention and illustrate preferred embodiment of the present invention. Unless otherwise indicated, all parts and percentages are by weight.

EXAMPLES 1-3

Three over coated donor rolls were made according to the following procedure: A cylindrical steel core about 22 millimeters in diameter and about 400 millimeters long was abraded with 180 grit sand paper following by degreasing with toluene. The surface was scrubbed with an abrasive cleaner, Ajax, washed thoroughly with water and immediately primed with Dow Corning primer DC1200 to a thickness of about 0.005 to 0.0075 millimeters. The primed core was air dryed under ambient conditions for 30 minutes followed by baking at 150° C. for 30 minutes. The primed core was placed in a mold for formation of the intermediate silicone rubber layer. Part A and Part B of Dow Corning LSR590 were thoroughly mixed and injected into the donor roll mold to form an intermediate layer about 6.3 millimeters on the primed core which was cured at 150° C. for 10–15 minutes. The silicone surface layer was abraded to remove any mold release and cleaned with isopropyl alcohol. The donor layer was prepared from 100 grams of Viton GF, 1.0 gram of calcium hydroxide, 2.0 grams of magnesium oxide, Maglite D available from C. P. Hall, Chicago, Ill., and 15 grams of cupric oxide which were mixed on a two roll mill. The mixed elastomer compound was added to 865 grams of methyl isobutyl ketone which was placed in a ceramic container without media and rolled until the elastomer compound was completely disolved/dispersed (about 17-24 hrs.) to form a 12% solids dispersion. A solution of 5 grams of Viton Curative 50 in 42.5 grams of methyl ethyl ketone was added and the combined mixture was shaken for about 15 minutes after which it was sprayed over the clean and abraded silicone intermediate layer to a thickness of about 0.04 millimeters. The fluoroelastomer layer was allowed to ambient desolvate for 24 hours followed by a step post curing in an oven for 2 hours at 93° C., followed by 2 hours at 149° C., followed by 2 hours at 177° C., followed by 2 hours at 208° C. 16 hours at 232° C. The three rolls were each tested as release agent donor rolls in Xerox 5090 duplicators delivering functional silicone oil to the fuser roll with the tests being suspended after 3 million print for each roll with no failure and no evidence of swelling or chunking.

By contrast donor rolls prepared according to example 8 of the above referenced U.S. Pat. No. 4,659,621 when subjected to the same test in a Xerox 5090 duplicator, generally exhibited poor surface integrity and swelling by 1.5 million prints.

EXAMPLE 4

A donor roll was prepared according to the procedure of Example 1, except that the donor layer did not contain any cupric oxide. The roll was subjected to the same testing in a Xerox 5090. After about 20,000 prints toner from the fuser roll started to transfer to the donor roll making it dirty and providing toner deposits which were subsequently transferred back to the fuser roll and ultimately to the prints thereby providing unacceptable dirty prints.

Thus, according to the present invention a new and improved release agent donor member and fusing assembly have been provided. In particular, a release agent donor member of greatly improved reliability and life has been provided. This is achieved with a composite donor roll having a barrier layer that is capable of transporting functional release agent in sufficient quantities to the fuser roll while at the same time acting as a barrier to prevent penetration of the intermediate silicone elastomer layer by the functional release agent.

In addition to not swelling it has the additional advantage of being strong enough or tough enough to resist wear and be dimensionally stable. Furthermore, the fluoroelastomer surface on the donor roll is resistant to degradation by the degradation products of certain charge control agents used to impart the desired charge to the toner particle such as disteryl dimethyl ammonia methyl sulfate (DDAMS). This is in part achieved with the use of reduced quantity of inorganic base in curing the fluoroelastomer to provide minimal dehydroflorination of the fluoroelastomer thus providing fewer active sights which are susceptible to neucleophyllic attack by the degradation products of disteryl dimethyl ammonia methyl sulfate (DDAMS).

All the patent applications and other documents referred to herein are hereby specifically and totally incorporated by reference in their entirety in the instant specification.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A release agent donor member for a toner fixing system of the type wherein a polymeric release agent having functional groups is applied to the surface of a fuser member, the release agent donor member comprising a base member, an intermediate conformable silicone elastomer layer and an elastomer release agent donor layer comprising poly(vinylidenefluoride-hexafluoropropylene-tetrafluoroethylene) where the vinylidenefluoride is present in an amount less than 40 mole percent, a metal oxide present in an amount sufficient to interact with the polymeric release agent having functional groups to transport a sufficient amount of the polymeric release agent to provide an interfacial barrier layer between the fusing surface and the toner and being substantially unreactive with said elastomer, said elastomer release agent donor layer having been cured from a solvent solution thereof with a nucleophilic curing agent soluble in said solution and in the presence of less than 4 parts by weight of inorganic base per 100 parts of polymer, said inorganic base being effective to at least partially dehydrofluorinate the vinylidenefluoride.

2. The donor member of claim 1 wherein the nucleophilic curing agent is a bisphenol crosslinking agent.

3. The donor member of claim 2 wherein the nucleophilic curing agent further comprises an organophosphonium salt accelerator.

4. The donor member of claim 1 wherein the metal oxide is cupric oxide which is present in an amount of from about 5 to 30 parts by weight per 100 parts by weight of polymer.

5. The donor member of claim 4 wherein the cupric oxide particles have a diameter of from about 4 to 8 microns.

6. The donor member of claim 1 wherein the base member is a cylindrical roll, said intermediate silicone elastomer layer comprises the crosslinked product of a mixture of at least one polyorganosiloxane having the formula:

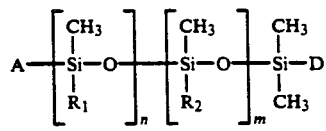

where $R_1$ and $R_2$ may be any of hydrogen or unsubstituted alkly, alkenyl or aryl having less than 19 carbon atoms, or fluorosubstituted alkyl having less than 19 carbon atoms each of A & D may be any of hydrogen, methyl, hydroxyl or vinyl groups and $0 < (m/n) \leq 1$ and $m+n > 350$; crosslinking agent and crosslinking catalyst.

7. The donor member of claim 6 wherein the intermediate layer is from about 5.5 millimeters to about 6.5 millimeters thick and said release agent donor layer is from about 0.025 to about 0.1 millimeters in thickness.

8. The donor member of claim 7 wherein it has a hardness of from about 35 to 45 Shore A.

9. A fusing assembly for fixing toner images to a substrate of the type wherein a polymeric release agent having functional groups is applied to the surface of a fuser member comprising:
(A) a heated fuser roll;
(B) a pressure roller engaging said fuser roller to provide a nip therebetween through which a copy sheet having an unfused toner image may be passed to fuse said toner image by contact with said heated fuser roll;
(C) means to apply a polymeric release agent having functional groups to the surface of said fuser roll, said means including a release agent donor member comprising a base member, an intermediate conformable silicone elastomer layer and an elastomer release agent donor layer comprising poly(vinylidenefluoride-hexafluoropropylene-tetrafluoroethylene) where the vinylidenefluoride is present in an amount less than 40 mole percent, a metal oxide a present in an amount sufficient to interact with the polymeric release agent having functional groups to transport a sufficient amount of polymeric release agent to provide an interfacial barrier layer between the surface and the toner and being substantially unreactive with said elastomer, said elastomer release agent donor layer having been cured from a solvent solution thereof with a nucleophilic curing agent soluble in said solution and in the presence of less than 4 parts by weight of inorganic base per 100 parts of polymer, said inorganic base being effective to at least partially dehydrofluorinate the vinylidenefluoride.

10. The fuser member of claim 9 wherein the nucleophilic curing agent is a bisphenol crosslinking agent.

11. The fuser member of claim 10 wherein the nucleophilic curing agent further comprises an organophophonium salt accelerator.

12. The fuser member of claim 9 wherein the metal oxide is cupric oxide which is present in an amount of from about 5 to 30 parts by weight pert 100 parts by weight of polymer.

13. The fuser member of claim 12 wherein the cupric oxide particles have a diameter of from about 4 to 8 microns.

14. The fusing assembly of claim 9 wherein the base member is a cylindrical roll, said intermediate silicone elastomer layer comprises the crosslinked product of a mixture of at least one polyorganosiloxane having the formula:

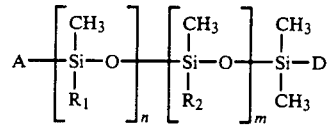

where $R_1$ and $R_2$ may be any of hydrogen or unsubstituted alkyl, alkenyl or aryl having less than 19 carbon atoms or fluorosubstitued alkyl having less than 19 carbon atoms each of A&D may be any of hydrogen, methyl, hydroxyl or vinyl groups and $O<(m/n)\leq 1$ and $m+n>350$ crosslinking agent and crosslinking catalyst.

15. The fusing assembly of claim 14 wherein the intermediate layer is from about 5.5 millimeters to about 6.5 millimeters thick and said release agent donor layer is from about 0.025 to about 0.1 millimeters in thickness.

16. The fusing assembly of claim 15 wherein it has a hardness of from about 35 to 45 Shore A.

17. The fusing assembly of claim 14 wherein said fuser roll is positively driven and said donor roll is rotatably driven by frictional contact with said fuser roll.

18. The fuser assembly of claim 17 including a release agent sump and a release agent delivery roll for delivering release fluid from said sump to said donor roll.

* * * * *